(12) United States Patent
Lepage et al.

(10) Patent No.: US 9,926,144 B1
(45) Date of Patent: Mar. 27, 2018

(54) LUMBER TRANSFER SYSTEM WITH INDIVIDUALLY CONTROLLED GRASPING FINGERS

(71) Applicant: CARBOTECH INTERNATIONAL, Plessisville (CA)

(72) Inventors: Francis Lepage, Dolbeau-Mistassini (CA); Louis Beaudet, Sainte-Sophie-d'Halifax (CA)

( * ) Notice: Subject to any disclaimer, the term of this patent is extended or adjusted under 35 U.S.C. 154(b) by 0 days.

(21) Appl. No.: 15/716,864

(22) Filed: Sep. 27, 2017

Related U.S. Application Data

(60) Provisional application No. 62/400,270, filed on Sep. 27, 2016.

(51) Int. Cl.
| | |
|---|---|
| *B65G 47/84* | (2006.01) |
| *B65G 47/86* | (2006.01) |
| *B65G 43/08* | (2006.01) |
| *B65G 47/32* | (2006.01) |
| *B65G 47/26* | (2006.01) |
| *B27B 31/00* | (2006.01) |

(52) U.S. Cl.
CPC .......... *B65G 43/08* (2013.01); *B65G 47/261* (2013.01); *B65G 47/847* (2013.01); *B27B 31/00* (2013.01); *B65G 2201/0217* (2013.01); *B65G 2201/0282* (2013.01); *B65G 2203/0233* (2013.01); *B65G 2203/041* (2013.01); *B65G 2203/044* (2013.01)

(58) Field of Classification Search
CPC .... B65G 43/08; B65G 47/261; B65G 47/847; B65G 2201/0217; B65G 2201/0282; B65G 2203/0233; B65G 2203/041; B65G 2203/044; B65G 47/84; B65G 47/846; B65G 47/32; B27B 31/00
See application file for complete search history.

(56) References Cited

U.S. PATENT DOCUMENTS

| | | | | |
|---|---|---|---|---|
| 4,869,360 A | * | 9/1989 | Brown | B27B 31/00 198/459.6 |
| 5,518,106 A | * | 5/1996 | Allard | B27B 31/00 198/459.5 |
| 5,662,203 A | | 9/1997 | St-Pierre et al. | |

(Continued)

FOREIGN PATENT DOCUMENTS

| | | |
|---|---|---|
| CA | 2148322 | 9/1998 |
| CA | 2185620 | 8/2000 |
| CA | 2853738 | 11/2014 |

*Primary Examiner* — Mark A Deuble
(74) *Attorney, Agent, or Firm* — Benoit & Cote, Inc.; C. Marc Benoit

(57) ABSTRACT

A lumber transfer system for transferring pieces of lumber comprising a feeding conveyor having a conveying surface for receiving the pieces of lumber; a plurality of grasping assemblies spaced apart transversely along the conveying surface, each one of the grasping assemblies comprising a grasping finger able to be positioned independently for either grasping a piece of lumber located upstream from the grasping assembly and moving it, or preventing it from grasping a piece of lumber; a detection system for detecting a presence of a piece of lumber and producing signals; and a controller controlling the grasping assemblies for the grasping fingers to be positioned independently. The lumber transfer system is therefore able to have only grasping fingers responsible to grasp the piece of lumber to be in a grasping position.

20 Claims, 12 Drawing Sheets

(56) References Cited

U.S. PATENT DOCUMENTS

| | | | |
|---|---|---|---|
| 5,752,594 A | 5/1998 | Fournier | |
| 5,921,376 A * | 7/1999 | Michell | B65G 47/8823 |
| | | | 198/459.5 |
| 5,931,287 A | 8/1999 | Fournier | |
| 6,220,423 B1 * | 4/2001 | Gagnon | B27B 31/006 |
| | | | 198/460.1 |
| 8,104,604 B2 * | 1/2012 | Beaudet | B27B 31/00 |
| | | | 198/459.6 |
| 9,376,270 B2 * | 6/2016 | Petryshen | B65G 47/248 |

* cited by examiner

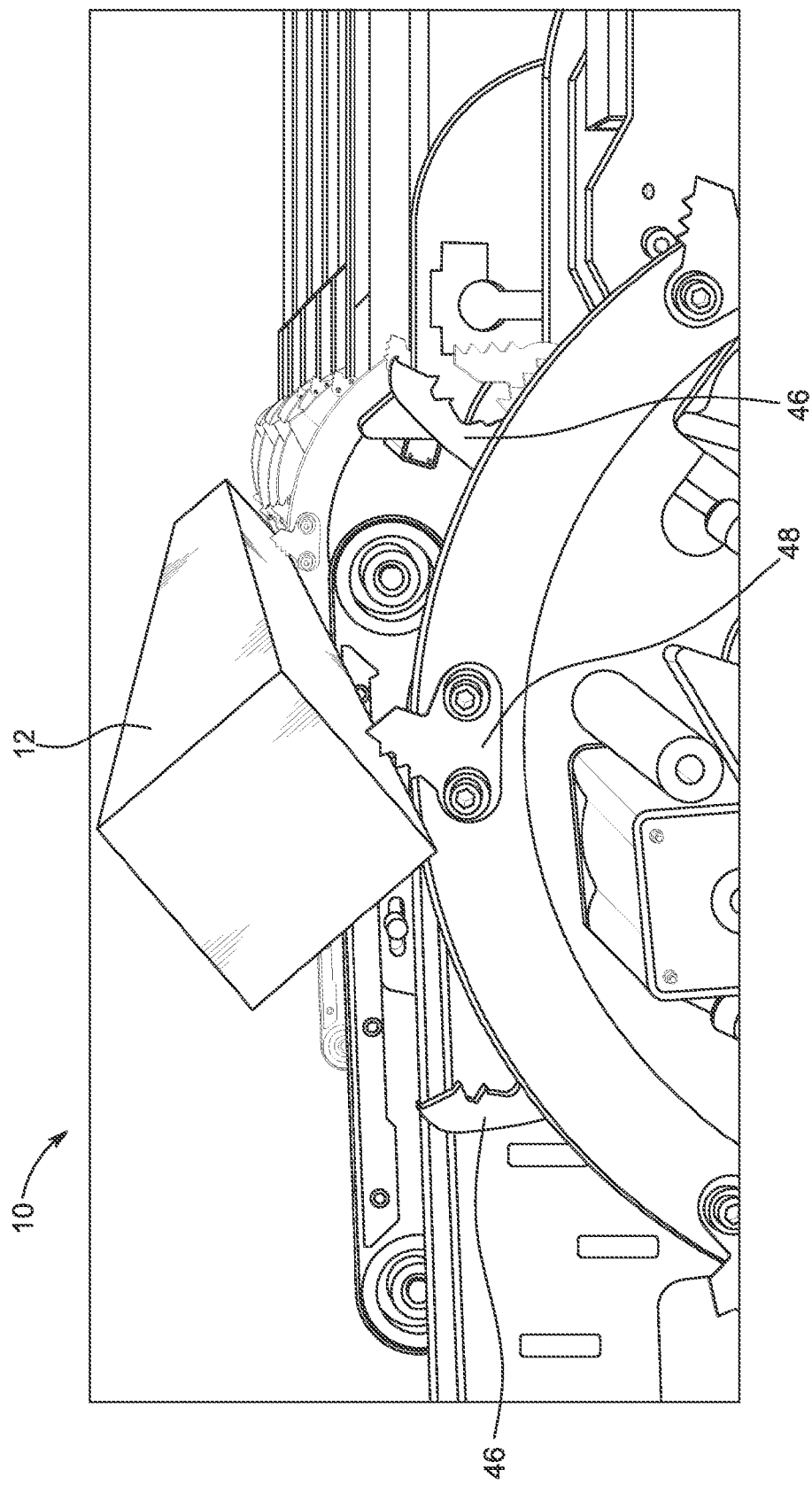

LUMBER TRANSFER SYSTEM WITH INDIVIDUALLY CONTROLLED GRASPING FINGERS

CROSS-REFERENCE TO RELATED APPLICATION

This application claims priority from U.S. patent provisional application 62/400,270 filed Sep. 27, 2016, the specification of which is hereby incorporated herein by reference in its entirety.

BACKGROUND

(a) Field

The subject matter disclosed generally relates to systems for sorting or unscrambling pieces of lumber and to methods of operating the same.

(b) Related Prior Art

It is well known in the art that in a saw mill or a lumber mill, transportation of the lumber pieces of lumber requires the use of conveyors. Usually, the pieces of lumber emerge from the mill in random order onto a feeding conveyor. Certain given stages of the transformation process require that the pieces of lumber be regularly spaced apart on a conveyor. It is therefore necessary to provide a system for transferring the pieces of lumber from the feeding conveyor to another conveyor such that the pieces of lumber are regularly spaced thereon. In order to be efficient, lumber transfer systems should allow handling and transfer of any type, size and shape of pieces of lumber such as stem, saw log, wood plank, beam and the like. Furthermore, they should also allow a high transfer rate of pieces of lumber. In fact, the efficiency of a lumber mill generally depends greatly on the production rate attainable. The number of pieces of lumber transferred per minute from one conveyor to another is thus an important factor affecting greatly the production rate of lumber mills.

Examples of transfer lumber systems known to the Applicant are described in the following Canadian patents and/or patent applications: 1,171,020; 1,228,873; 2,133,927; 2,148, 322; 2,151,768; 2,185,609; 2,185,620; 2,238,231; 2,271, 175; and 2,577,656.

It is also well known in the art that pieces of lumber arriving on the feeding conveyor prior to being transferred and equally spaced by the transfer system are often intermingled and comprise different pieces of various lengths. Prior to being transferred, the pieces of lumber are accumulated on an accumulating portion of the feeding conveyor, where typically, conveying chains roll at high speed. When a short lumber is followed by a long one, the long lumber has a tendency to pivot around the short lumber. Since the extremity of the longer lumber stands out relative to the downstream shorter lumber, this longer extremity is driven by the chains, and/or in some cases, by a pushing action of other following pieces of lumber, and this situation leads to an important problem where the transfer system will load the long lumber together with the short one, while only the short lumber should have been transferred. When such problem occurs, production must be stopped and an operator must space out and put the pieces of lumber back in order. Such a problem commonly occurs in lumber mills and affects the overall efficiency of the mills.

Hence, in light of the aforementioned, there is a need for an improved system which, by virtue of its design and components, would be able to overcome or at least minimize some of the aforementioned prior art problems.

SUMMARY

According to an embodiment, there is disclosed a lumber transfer system for transferring longitudinal pieces of lumber from a feeding conveyor to an outfeed conveyor, the pieces of lumber being conveyed in a conveying direction which is substantially transverse to their length, the lumber transfer system comprising: a detection system adapted for monitoring a presence of a piece of lumber and for producing detection signals; grasping assemblies spaced apart transversely relative to the conveying direction; and a controller, in communication with the detection system and the grasping assemblies, that receives the detection signals from the detection system, processes the detection signals to produce discrete control signals and sends the discrete control signals to each one of the grasping assemblies; wherein each one of the grasping assemblies is adapted to independently adopt, based on the discrete control signals, at least a grasping position and a stowed position, wherein, in the grasping position, the grasping assemblies grasps a piece of lumber to transfer it from the feeding conveyor to the outfeed conveyor, and wherein, in the stowed position, a piece of lumber remains ungrasped by the grasping assemblies.

According to an aspect, the lumber transfer system further comprises a detection corridor oriented substantially transversely with respect to the conveying direction, wherein the detection system is adapted for monitoring a presence of a piece of lumber within the detection corridor and thereby produce the detection signals.

According to an aspect, the grasping assemblies are located downstream from the detection corridor.

According to an aspect, the detection system comprises: a combination of detectors detecting a presence of a piece of lumber relative to discrete portions of the detection corridor, and one or more detectors detecting in combination a presence of a piece of lumber over an entirety of the detection corridor.

According to an aspect, the detection system comprises at least one of: a camera, a photocell detector, and an ultrasound detector.

According to an aspect, the detection system is contact-free.

According to an aspect, the detection system comprises a contact-based component detecting a presence of a piece of lumber upon contact with a piece of lumber.

According to an aspect, each one of the grasping assemblies comprises a grasping finger adapted for adopting the grasping position and the stowed position.

According to an aspect, the lumber transfer system further comprises at least one of blocking fingers and positioning fingers, wherein the controller further controls at least one of the blocking fingers and the positioning fingers.

According to an embodiment, there is described a lumber transfer system for transferring pieces of lumber along a conveying direction comprising an exit, the lumber transfer system comprising: a feeding conveyor having a conveying surface for receiving the pieces of lumber in a substantially transverse orientation with respect to the conveying direction, and for conveying the pieces of lumber therealong downstream toward the exit; grasping assemblies spaced apart transversely along the conveying surface, each one of the grasping assemblies comprising a grasping finger able to be positioned independently in a grasping position and a stowed position, wherein the grasping finger in the grasping position is capable to grasp a piece of lumber located upstream from each one of the grasping assemblies and to move the piece of lumber in a downstream position, and wherein the grasping finger in the stowed position prevents the grasping finger from grasping a piece of lumber located upstream therefrom; a detection system for: detecting a presence of a piece of lumber within a detection corridor oriented substantially transversely with respect to the conveying direction and upstream from the grasping assemblies, and producing detection signals based on detection of a presence of a piece of lumber; and a controller for receiving the detection signals from the detection system, processing the detection signals and sending discrete control signals to the grasping assemblies for the grasping fingers to be positioned independently in either one of the grasping position and the stowed position, wherein the lumber transfer system is able to have only grasping fingers responsible for grasping the piece of lumber in the grasping position.

According to an aspect, the grasping assemblies are spaced apart unevenly.

According to an aspect, the detection system comprises at least one selected from a group comprising: a camera, a photocell detector, an ultrasound detector.

According to an aspect, the detection system is contact-free.

According to an aspect, the detection system comprises a contact-based component detecting a presence of a piece of lumber upon contact with a piece of lumber.

According to an aspect, the detection system for detecting presence of a piece of lumber within the detection corridor comprises: a combination of detectors detecting a presence of a piece of lumber relatively to discrete portions of the detection corridor, and one or more detectors detecting presence of a piece of lumber over an entirety of the detection corridor.

According to an aspect, the lumber transfer system further comprises at least one of blocking fingers and positioning fingers, wherein the controller further controls at least one of the blocking fingers and the positioning fingers.

According to an aspect, the lumber transfer system further comprises a shaft driven at a speed with the grasping assemblies being mounted thereto, wherein the controller further controls the speed of the shaft.

According to an aspect, the lumber transfer system further comprises at least one of a feeding conveyor and an outfeed conveyor, wherein the controller further controls a speed of one of the feeding conveyor and the outfeed conveyor.

According to an aspect, the grasping assemblies further comprise biasing means, wherein the biasing means forces the grasping fingers in the stowed position when not actuated.

According to an aspect, each one of the grasping assemblies further comprises a tooth cooperating with the grasping finger, wherein the tooth is operable between an extended position and a contracted position concurrently with a positioning of the cooperating grasping finger.

According to an embodiment, there is disclosed a lumber transfer system for transferring pieces of lumber along a conveying direction comprising an exit, the lumber transfer system comprising:
a feeding conveyor having a conveying surface for receiving the pieces of lumber in a substantially transverse orientation with respect to the conveying direction, and for conveying the pieces of lumber therealong downstream toward the exit, the feeding conveyor further comprising a detection corridor oriented substantially transversely with respect to the conveying direction;
a detection system adapted for monitoring a lumber presence within the detection corridor and for producing detection signals;
grasping assemblies located downstream from the detection corridor and spaced apart transversely along the conveying surface, each one of the grasping assemblies comprising a grasping finger able to be positioned independently in a grasping position and a stowed position, wherein the grasping position is for grasping a piece of lumber located upstream from each one of the grasping assemblies and for moving the piece of lumber in a downstream position, and wherein the stowed position does not allow grasping a piece of lumber located upstream from the grasping finger; and
a controller receiving the detection signals from the detection system, processing the detection signals and sending discrete control signals to the grasping assemblies for the grasping fingers to be positioned independently and accordingly in either one of the grasping position and the stowed position.

According to an embodiment, there is disclosed a method for transferring pieces of lumber along a conveying direction of a lumber transfer system that comprises:
a detector detecting lumber presence in a detection corridor transversal to the conveying direction;
a controller;
grasping motors; and
grasping fingers individually operable by the grasping motors and adapted to be positioned in a grasping position for grasping a piece of lumber and a stowed position for preventing grasping a piece of lumber, the method comprising the steps of:
a detector detecting a lumber presence along the detection corridor;
the detector transmitting a detection signal to a controller upon detection of a lumber presence indicative of an occupation of the detection corridor by the piece of lumber;
the controller transmitting control signals to the gasping motors based on the received detection signal;
the grasping motors operating grasping fingers for the grasping fingers positioned along the conveying direction of the piece of lumber to be positioned in a grasping position while having grasping fingers outside the conveying direction of the piece of lumber in a stowed position; and
the grasping fingers moving the piece of lumber downstream along the conveying direction.

According to an aspect, the method further comprises transmitting, by the controller, control signals to one of:
a motor driving a feeding conveyor conveying the pieces of lumber upstream toward the grasping fingers;
a motor driving an outfeed conveyor conveying the pieces of lumber downstream away from the grasping fingers; and
a motor driving a shaft having disks mounted thereto, wherein the grasping fingers are mounted to the disks.

According to an aspect, the method further comprises transmitting, by the controller, control signals to one of:
a blocking finger controller controlling positions of blocking fingers located upstream from the grasping fingers along the conveying direction; and a positioning finger controller controlling positions of positioning fingers located upstream from the grasping fingers along the conveying direction.

BRIEF DESCRIPTION OF THE DRAWINGS

Further features and advantages of the present disclosure will become apparent from the following detailed description, taken in combination with the appended drawings, in which:

FIG. 12 is a side perspective view of the lumber transfer system of FIGS. 10 and 11 at a later time when the grasping fingers have released their grip on the piece of lumber.

It will be noted that throughout the appended drawings, like features are identified by like reference numerals.

DETAILED DESCRIPTION

Figure 1:
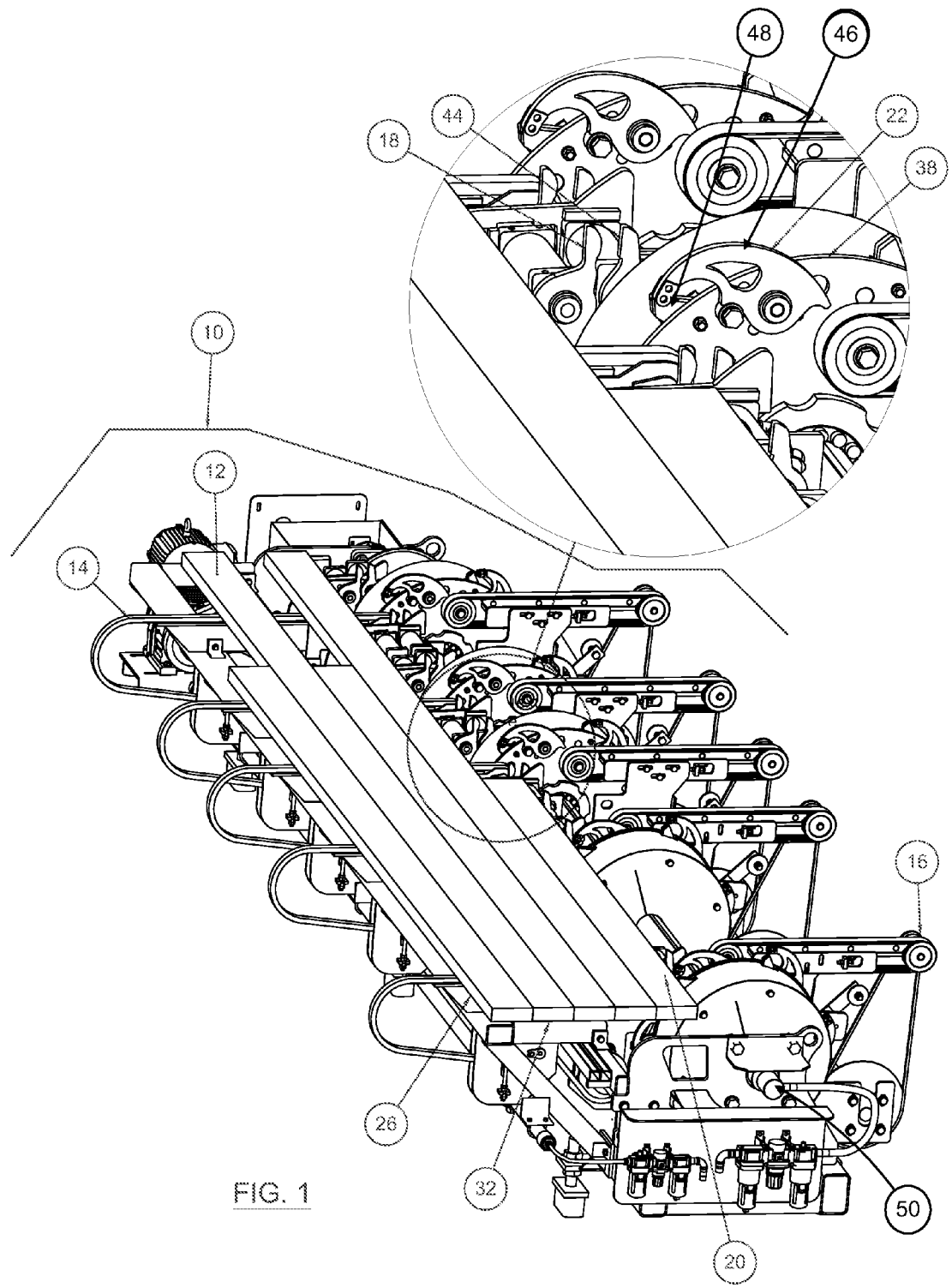
FIG. 1 is a perspective view of a lumber transfer system, comprising a close-up of grasping assemblies, according to an embodiment.

In the following description, the same numerical references refer to similar elements. The embodiments, geometrical configurations, materials mentioned and/or dimensions shown in the figures or described in the present description are embodiments only, given for exemplification purposes only.

Furthermore, to preserve the clarity of the drawings, some reference numerals may have been omitted if they were already identified in a preceding figure.

Moreover, although the embodiments describe herein were primarily designed for improving the conveyance or transfer of pieces of lumber from a feeding conveyor to an outfeed conveyor in a lumber mill, it may be used with other types of objects and for other purposes, in other fields, as apparent to a person skilled in the art. For this reason, expressions such as "conveying", "transferring", "lumber", "mill", etc., used herein should not be taken as to limit the scope of the present embodiments and includes all other kinds of objects or fields with which the present embodiments could be used and may be useful.

Moreover, in the context of the present description, the expressions "system", "assembly", "unit", "device" and any other equivalent expression and/or compound words thereof known in the art will be used interchangeably. Furthermore, the same applies for any other mutually equivalent expressions, such as "lumber", "elongated piece of lumber", "log", "plank", "board" and the like, or "segment", "portion" and "section", as well as "unblocked" and "conveying", for example, as also apparent to a person skilled in the art. Furthermore, and also in the context of the present description, the expressions "align", "orientate", "place" and "space" may also be used interchangeably, or even "second", "subsequent" and "upstream", as also apparent to a person skilled in the art.

In addition, although embodiments as illustrated in the accompanying drawings may comprise various components, and although the embodiments of the lumber transfer system as shown consists of certain geometrical configurations as explained and illustrated herein, not all of these components and geometries are essential to the embodiments and thus should not be taken in their restrictive sense, i.e., should not be taken as to limit the scope of the present description. It is to be understood, as also apparent to a person skilled in the art, that other suitable components and cooperation therebetween, as well as other suitable geometrical configurations may be used for the lumber transfer system and corresponding parts according to the present description, as will be briefly explained hereinafter and as can be easily inferred herefrom by a person skilled in the art, without departing from the scope of the description.

Broadly described, the present description, as illustrated in the accompanying drawings, relates to a lumber transfer system for improving the transfer of pieces of lumber from a feeding conveyor to an outfeed conveyor.

As previously explained, and as will be understood in greater detail hereinafter, the present embodiments are a substantial improvement over conventional lumber transfer systems or methods in that they comprise components and features that enable to control individually grasping fingers in response to detection signals so as to improve handling of pieces of lumber of different length and thereby to prevent a portion of a longer piece of lumber that has advanced at the level of a shorter piece of lumber immediately downstream to the longer one to be grasped along with the shorter piece of lumber, and therefore preventing the longer piece of lumber from being grasped and transferred into the outfeed conveyor with the shorter piece of lumber.

An advantage resulting from the present embodiments is that human intervention is substantially reduced in order to ensure a proper alignment between a pair of neighbouring pieces of lumber (i.e. a pair of first and second pieces of lumber, the first one being conveyed downstream, and the second or "subsequent" one, following upstream along the conveyor), especially in cases when one is much longer than the other, and that the resulting parallel pieces of lumber having thus been realigned or reoriented by the lumber transfer system can thus be individually transferred from the feeding conveyor to a outfeed conveyor in a much improved manner (faster, more reliable, etc.), thereby significantly improving productivity and other desirable factors related to the operation of a mill.

Referring to FIG. 1, there is shown a lumber transfer system 10 according to an embodiment. The lumber transfer system 10 is used for individually transferring substantially parallel and longitudinal pieces of lumber 12 from a feeding conveyor 14 to an outfeed conveyor 16, and regularly spacing the pieces of lumber 12 on said outfeed conveyor 16.

According to an embodiment, the lumber transfer system 10 includes: a feeding conveyor 14; blocking fingers 18 and/or positioning fingers 44 for stopping a piece of lumber 12 at some locations on the conveying surface 26; a plurality of grasping assemblies 22 for regularly transferring the pieces of lumber 12 onto an outfeed conveyor 16 for conveying the transferred and regularly spaced pieces of lumber 12; and a controller 24 for synchronizing the overall operation of the lumber transfer system 10.

Figure 3:
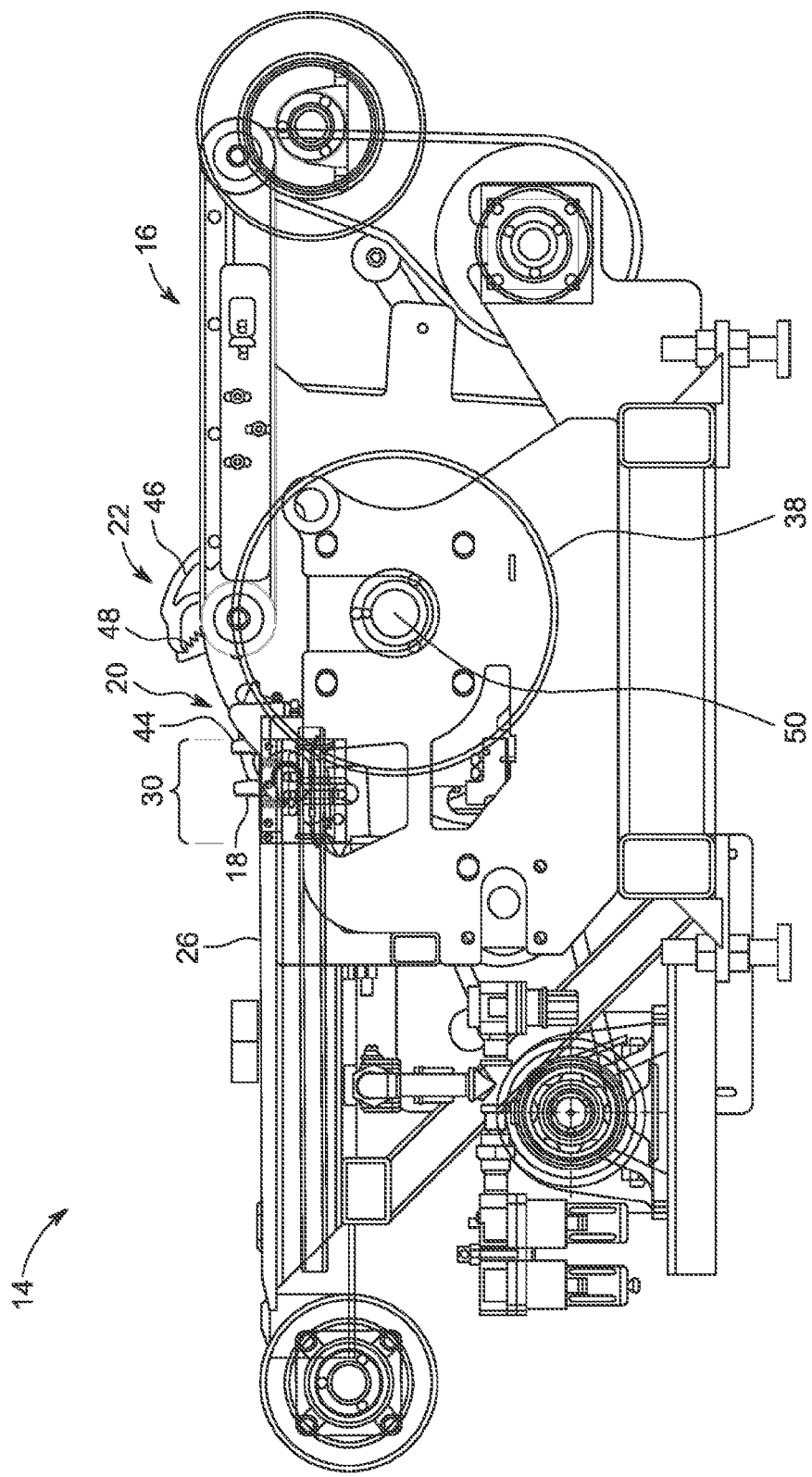
FIG. 3 is a side view of a portion of the lumber transfer system shown in FIG. 1.

The feeding conveyor 14, e.g., a belt or a chain conveyor, has a longitudinal conveying surface 26 (best shown in FIG. 3) over which substantially parallel pieces of lumber 12 are conveyed. Typically, the feeding conveyor 14 receives pieces of lumber 12 accumulating thereon from a plant conveyor which is part of the mill. The pieces of lumber 12 may be intermingled and are generally of various lengths and widths. Although it is not a prerequisite, the pieces of lumber 12 conveyed on the feeding conveyor 14 are aligned on one reference side 32 (often referred to as the 0" side). Alternatively, the pieces of lumber 12 may be placed at any suitable position. For example, the pieces of lumber 12 may be centered or unpredictably positioned with respect to the conveying surface 26. As shown, the pieces of lumber 12 are conveyed in a direction transverse to their length.

Figure 2:
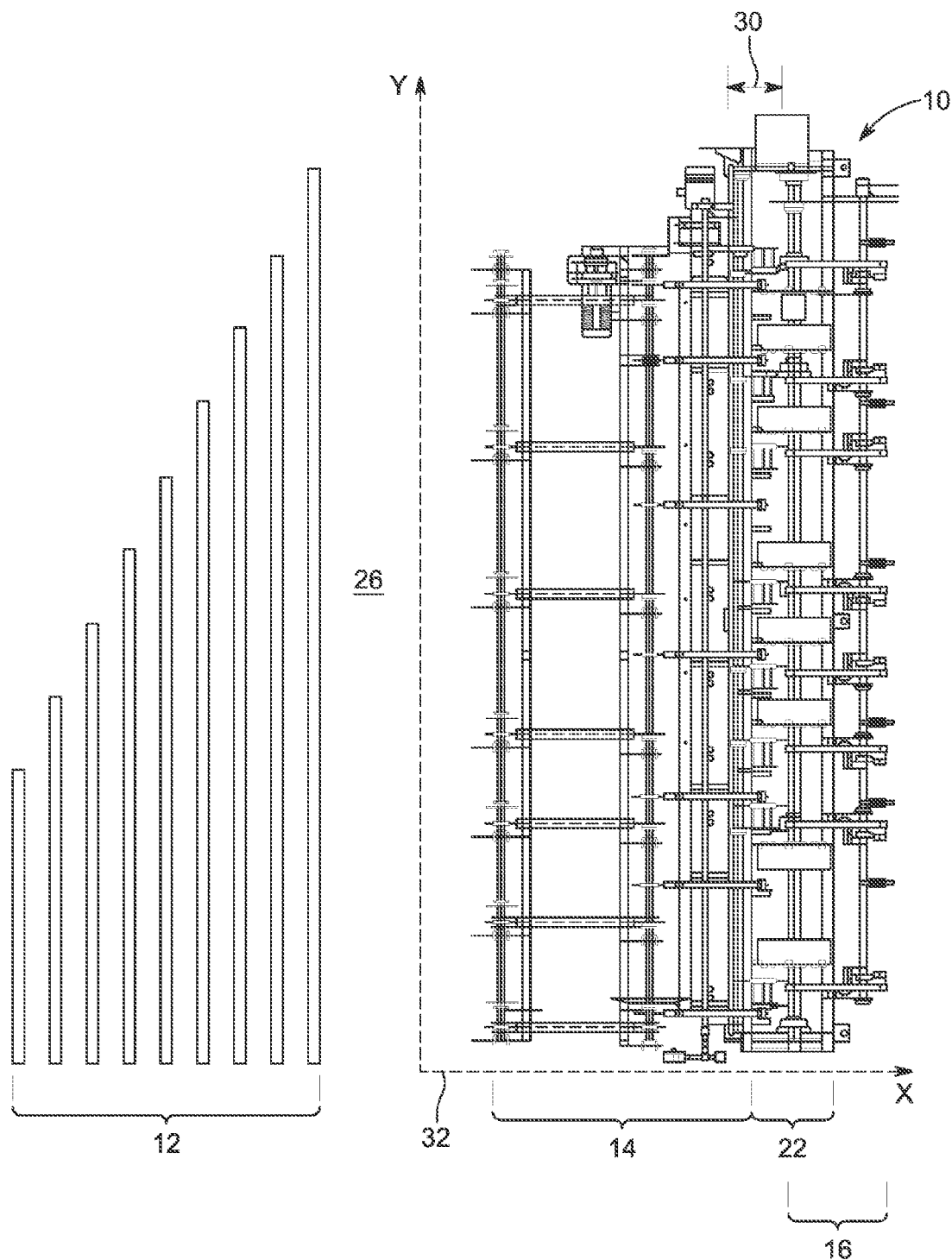
FIG. 2 is a schematic top view of a portion of a lumber transfer system according to another embodiment, the lumber transfer system being shown along with pieces of lumber of different lengths which may be processed with the lumber transfer system.

Now additionally referring to FIGS. 4 and 5, a detection system comprising detector(s) 28, hereinafter detectors 28 for description purpose, is used for monitoring a lumber presence (a presence of a piece of lumber) along a detection corridor 30 (shown in FIGS. 2 and 3) of the longitudinal conveying surface 26 of the feeding conveyor 14. The detectors 28 are located transversally to the surface 26, in line with one another. Although, according to alternative embodiments, other suitable dispositions may be used as it may be apparent to a person skilled in the art.

According to an embodiment, the detection corridor 30 consists of a detection line. According to alternative embodiments, the detection corridor 30 consists of an area, or a lane having a predetermined width, extending continuously or partially from one side to the other of the longitudinal surface, and over which each piece of lumber 12 conveyed will pass or cross. Preferably, while not in a limiting manner, the detection corridor 30 is a substantially straight line substantially transversal to the conveyed direction (aka the conveying direction).

According to other embodiments, the detectors 28 may be of many kinds, such as photocells detectors, ultrasound detectors or a single one or a plurality of cameras, which are able to detect a presence of a piece of lumber in the detection corridor 30. While contact-free detection technology is preferred, contact-based detection solutions producing when contacted by a piece of lumber 12 a may also be used.

The detectors 28 are placed according to a first embodiment along the detection corridor 30, underneath the conveying surface 26. According to an alternative embodiment, they are positioned over the conveying surface or on the side of each belt forming the conveying surface 26. Moreover, according to alternative embodiment, the detectors 28 are positioned at any suitable distance of the conveying surface 26, so long as they each adequately detect the presence of a piece of lumber within the associated segment of the detection corridor 30. According to an embodiment, the detectors 28 are installed as a combination of detectors 28 detecting a presence of a piece of lumber relatively to discrete portions (sub-sections) of the detection corridor 30 that do not cover the whole detection corridor 30 but are indicative of presence and length of pieces of lumber 12 within the detection corridor 30. According to an embodiment, the detectors 28 are detecting, in combination, presence of a piece of lumber over the whole detection corridor 30.

By lumber presence, it is understood that the detectors 28 will detect the presence of a lumber segment or portion in the "field of view" or "field of detection" of the detectors 28. In other words, the detectors 28 provide indication as to where up to a piece of lumber 12 extends from the reference side 32 (a.k.a. 0" side) along at least a portion of the transverse detecting corridor 30. As illustrated in FIG. 5, the reference side 32 of the conveying surface 26 can be considered as an X-axis, each piece of lumber 12 having (by default) one end aligned with the axis, and the other end of the pieces of lumber 12 extending to a different length Y. For example, in the embodiment illustrated in FIG. 5, nine detectors 28 are shown. Starting from the reference side 32 (illustrated as the X-axis), if the first two detectors 28 detect a lumber presence, and the subsequent detectors 28 (third detector to the ninth one) do not detect any lumber presence, it can be considered that the piece of lumber's length extends from the 0" position, namely the reference side 32, to a length Yi, in the interval between the second and third detectors 28. It is worth mentioning that depending on the applications for which the lumber transfer system 10 is intended for, the detectors 28 are equally spaced from one another or spaced by discrete uneven distances.

According to an embodiment, the detection system is adapted to detect the presence, orientation and/or length of the pieces of lumber 12 located in a detection corridor 30 defined as a grasping area close to the grasping assembly 22. Detection of the length means detection of the length of the piece of lumber 12 as substantially the positions of the ends of the piece of lumber 12 along the Y-axis. Accordingly, the detection system is able to detect the presence, the number, the orientation and the distance between the pieces of lumber 12 in the detection corridor 30 close to the grasping area. Accordingly, the detection system is adapted to detect which of the grasping assemblies 22 are aligned to the piece of lumber 12 to be grasped.

According to an embodiment, other suitable detecting means, such as a scanner, is used for recognizing a given profile of a piece of piece of lumber 12, and comparing it with the profile of a subsequent piece of piece of lumber 12, in order to selectively, independently and operatively detect presence and relative positioning of both pieces of piece of lumber 12.

The detection system further comprises a controller 24. According to an embodiment, each one of the detectors 28 is individually linked, connected or coupled, by wire, to at least one input component 40 of a controller 24. According to another embodiment, wireless connections link at least some of the detectors 28 to the controller 24. The controller 24 is adapted to receive through the input components 40 signals from the detectors 28, to process individually and independently the signals received from each of the detectors 28 to produce discrete control signals, and to send accordingly the discrete control signals via output components 42 to the motorized blocking fingers 18 and via output components 43 to the grasping assemblies 22. The discrete control signals can be sent to the motorized blocking fingers 18 and the grasping assemblies 22 via dedicated signal paths for each one of the motorized blocking fingers 18 and the grasping assemblies 22, via a daisy chain type signal path arrangement, or via an addressable bus accessible by each one of the motorized blocking fingers 18 and the grasping assemblies 22 where each one the motorized blocking fingers 18 and the grasping assemblies 22 has a unique address.

According to an embodiment, control signals are sent in response to the detecting signals, for moving the respective blocking fingers 18 for which a lumber presence is detected from a blocking to an unblocking position and otherwise keeping the respective motorized blocking fingers 18 in their blocking position. Between each longitudinal piece of lumber 12 detected, the blocking fingers 18 may be kept in an unblocking position, or may return to a blocking position.

Figure 9:
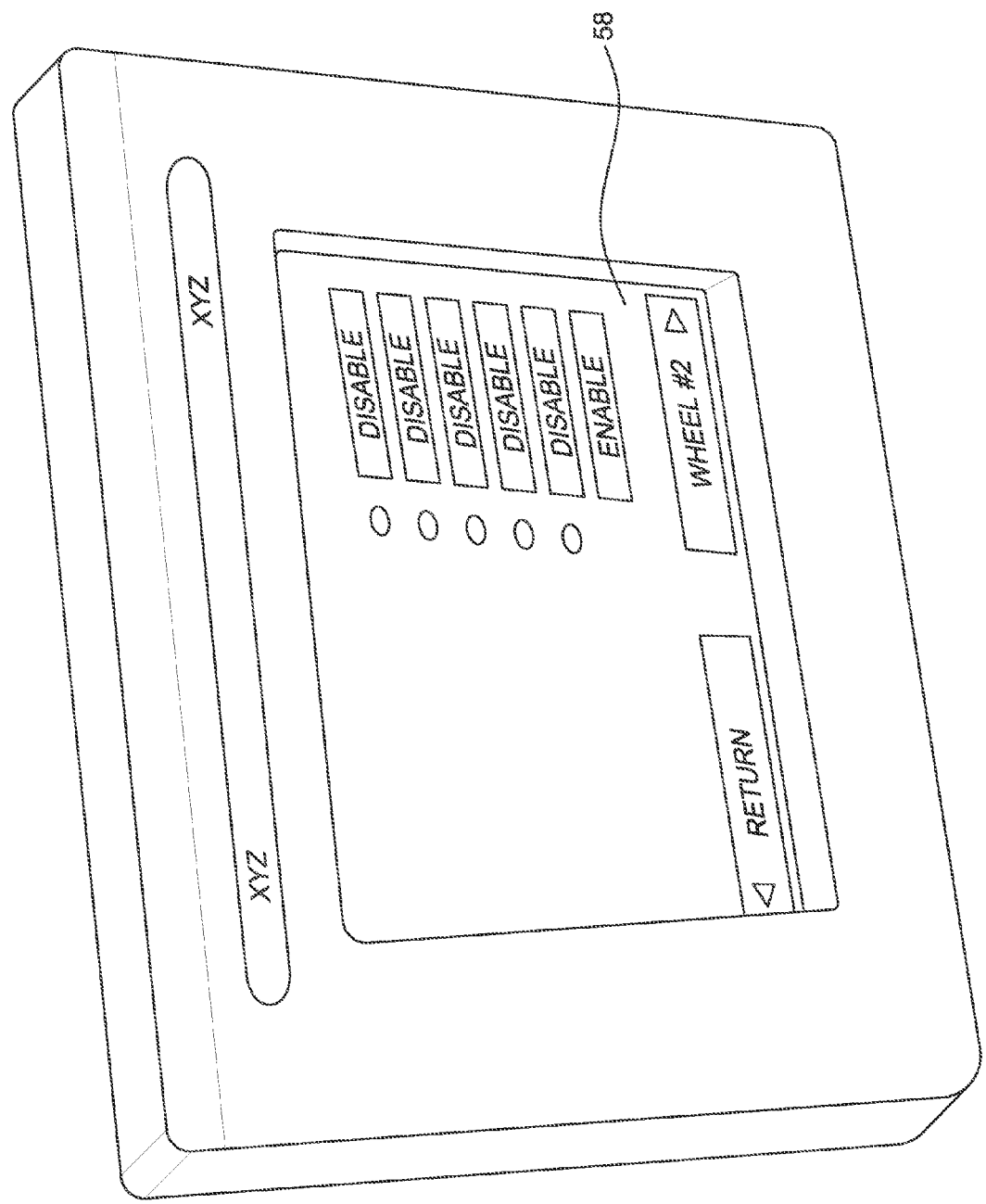
FIG. 9 is a front perspective view showing a controller, comprising its display, according to an embodiment.

Referring additionally to FIG. 9, the controller 24 is housed as in control box, aside the feeding conveyor 14. The controller 24 features a monitor 58 on which status of the grasping assemblies 22 is displayed. Controls, such as touch screen controls, are used to individually turn on, turn off, test components of the lumber transfer system 10 connected to the controller 24, and/or force the positioning of the grasping fingers into a selected position. According to alternative embodiments, alternative housing, location, interface and/or command controls are used for the controller 24.

As illustrated, the lumber transfer system 10 comprises blocking fingers 18 and positioning fingers 44 disposed at diverse locations along the conveying surface 26. These blocking fingers 18 and positioning fingers 44 are for hindering controllably the course of the pieces of lumber 12 on the conveying surface 26 to obtain a desired configuration of travelling pieces of lumber 12 on the conveying surface 26. In other embodiments, one or both of the blocking fingers 18 and the positioning fingers 44 are absent from the lumber transfer system 10. Furthermore, the blocking fingers 18 and/or the positioning fingers 44 can be activated controllably between a first position and a second position under control of a positioning controller. The positioning controller responsible for the positioning of the blocking fingers 18 and the positioning fingers 44 is, according to an embodiment, a single controller, and according to an embodiment, embodied as the controller 24 responsible for the positioning of the grasping fingers 46. According to an embodiment, the positioning controller is distinct from the controller 24.

According to an embodiment of the lumber transfer system 10 featuring positioning fingers 44, the positioning fingers 44 are placed right after (or in other words "downstream of") the blocking fingers 18, before (or in other words "upstream of") the grasping fingers 46. The positioning fingers 44 are for lying up or halting the pieces of lumber 12 that have passed the blocking fingers 18 (when present) in the proper location and position so that they may be adequately grasped or pinched by the grasping assemblies 22.

Thus, the normal course of the pieces of lumber 12 consists in the pieces of lumber 12 travelling from the feeding conveyor 14, to the blocking fingers 18 (when present), freed by the blocking fingers 18 (when present), and then halted by the positioning fingers 44 (when present) where the pieces of lumber 12 are grasped between the teeth 48 and the grasping fingers 46 of multiple grasping assemblies 22 and regularly transferred onto the outfeed conveyor 16. That process goes smoothly since the disks 38 and outfeed conveyor belts rotate at an even and predetermined speed.

Figure 6:
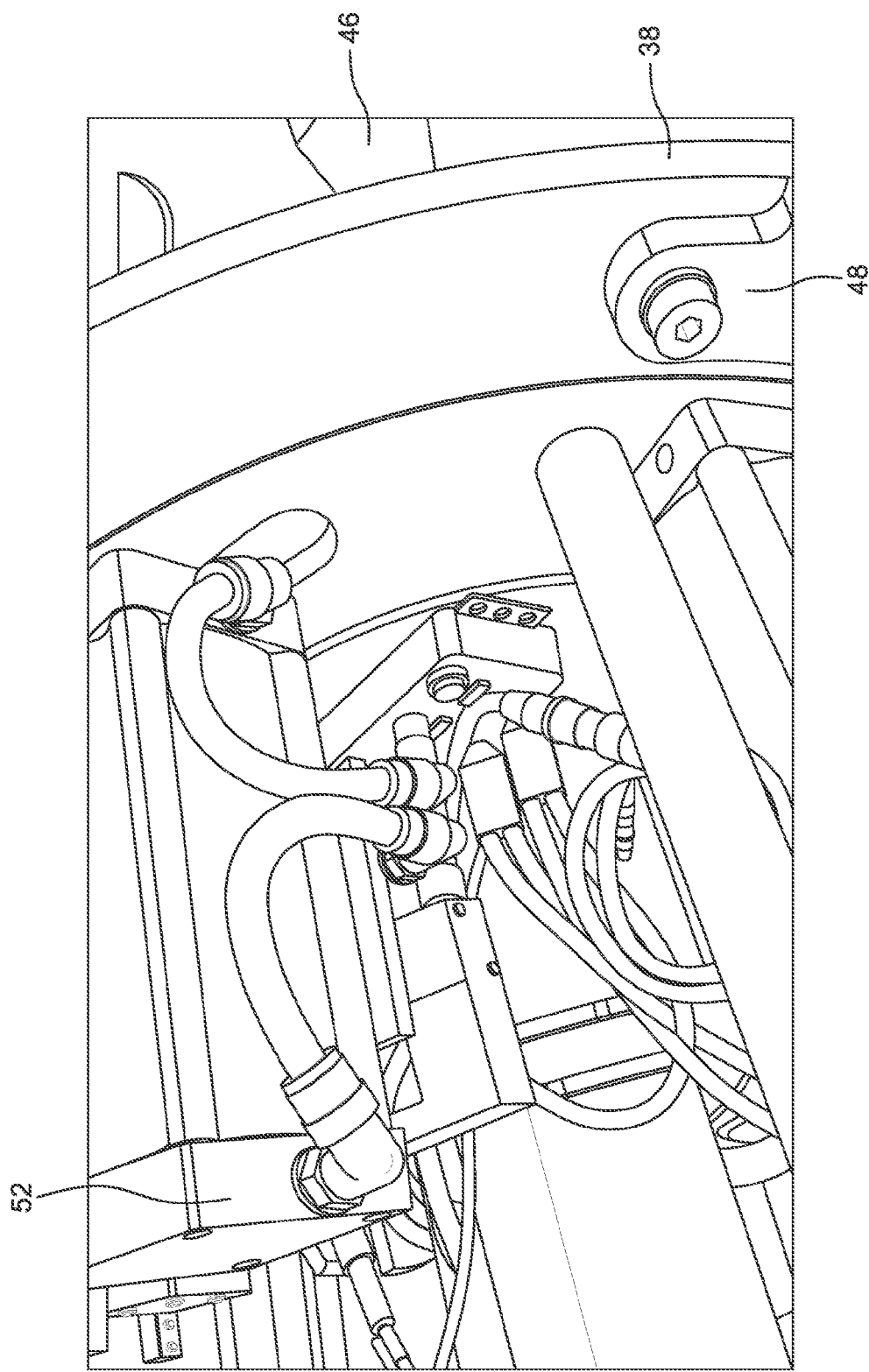
FIG. 6 is a front perspective view showing a grasping motor mounted to one side of a disk.
Figure 7:
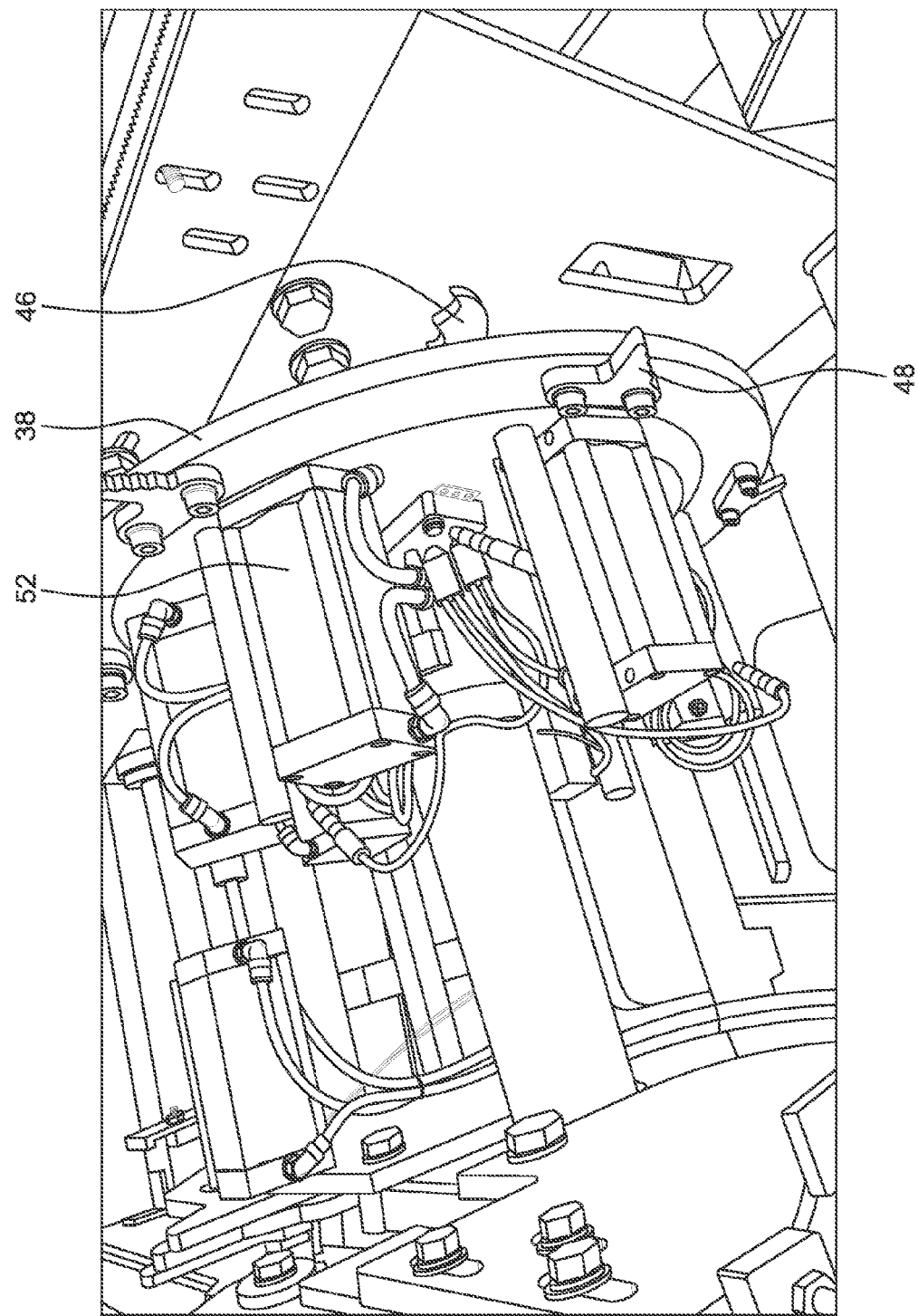
FIG. 7 is a front perspective view showing a plurality of grasping motors mounted to one side of a disk.
Figure 8:
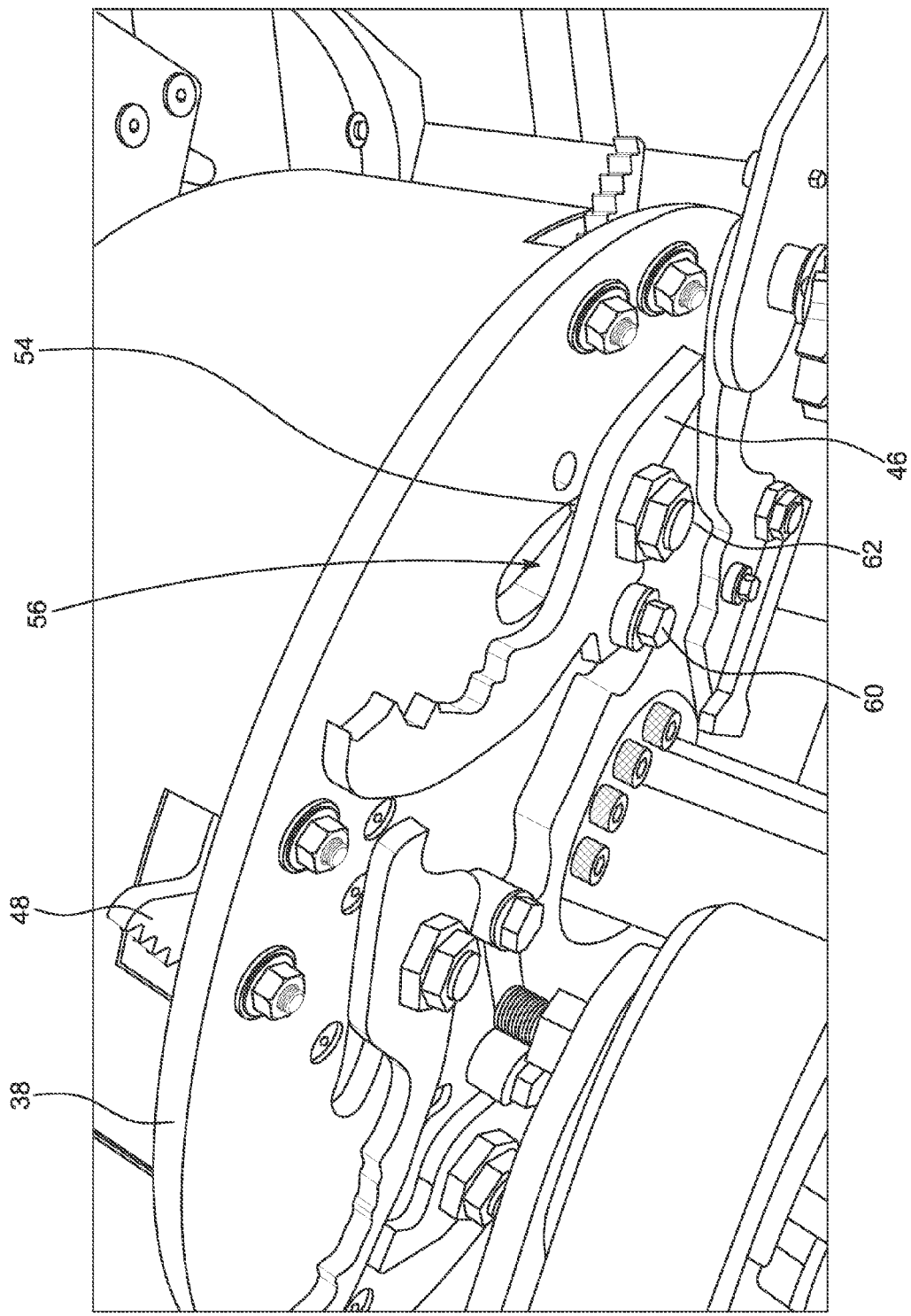
FIG. 8 is top perspective view showing a top view of a disk on which fixed teeth and grasping fingers are mounted.

In addition, FIGS. 6 to 8 illustrate the motorized grasping assemblies 22. The grasping assemblies 22 are located downstream of the detection corridor 30, or in other words somewhere between the detection corridor 30 and the exit 20 of the feeding conveyor 14. The grasping assemblies 22 are adapted for grasping a piece of lumber 12 and transferring the piece of lumber 12 to a downstream portion of the lumber transfer system 10. The grasping fingers 46 mounted to the disks 38 where they are awaiting to transfer the piece of lumber 12 from an upstream portion of the lumber transfer system 10 to a downstream portion of the lumber transfer system 10. The grasping assemblies 22 are aligned with each other, thereby having the disks 38 aligned with one another. The disks 38 are further mounted concurrently to a common disk shaft 50. According to an embodiment, each one of the grasping assemblies 22 comprises a grasping finger 46, a tooth 48 and a grasping motor 52.

Regarding the grasping assemblies 22, each one of the grasping assemblies 22 comprises a grasping finger 46 that is individually controllable between a grasping position and a stowed position; the grasping position consisting in a raised position wherein the grasping finger 46 is able, in collaboration with a tooth 48, to grasp or pinch a piece of lumber 12, while the stowed position consisting in a laid down position wherein the gasping finger 46 has its top face beneath or close to the outer surface of the disk 38 and wherein one piece of lumber 12 being located close to the disk 38 would not be grasped by the gasping finger 46.

Each gasping assembly 22 further comprises a tooth 48. The grasping finger 46 and the tooth 48 operate in collaboration as pliers, each defining a plier surface facing each other and adapted to grasp or pinch the pieces of lumber 12 and to hold the piece of lumber 12 while moving the piece of lumber 12 downstream. The tooth 48 and the gasping finger 46 are designed such as to have the strength and the grip qualities for grasping a piece of lumber 12 between the two plier surfaces and for moving and holding a piece of lumber 12 from a portion of the conveying surface 26 upstream to the disks 38 to a portion of the conveying surface 26 downstream from the disks 38 (that may be above the upstream location as illustrated on FIG. 3). According to non-limiting embodiments, the tooth 48 and the grasping finger 46 are made of steel, and features ridges on the plier surfaces to provide the desired non-slippery surface.

The grasping assemblies 22 are, according to an embodiment, mounted to disks 38. A plurality of grasping assemblies 22 are mounted to each disk 38; the grasping assemblies 22 being disposed at different angles along the periphery of the disks 38. The grasping assemblies 22 are designed to operate with the disks 38 rotating in a single direction, with one grasping assembly 22 taking the relay once the rotation of the disks 38 has moved a grasping assembly 22 in a non-operative angle.

An operating range is defined for each of the grasping assemblies 22. The operating range begins with the angle in which the grasping assembly 22 can grasp a piece of lumber 12 and the operating range ends with the angle in which the grasping assembly 22 releases the grasped piece of lumber 12 over the downstream portion of the conveying surface 26. For instance, an operative range of sixty (60) degrees could be defined as extending from zero (0) degrees to sixty (60) degrees. According to embodiments, the operating ranges of neighbor grasping assemblies 22 are slightly overlapping or not. Operating ranges and overlapping degrees are function of characteristics of the pieces of lumber 12 to be grasped.

In order to operate, the grasping fingers 46 are moved controllably between a grasping position and a stowed position. A series of gasping motors 52 are driving individually the grasping fingers 46 between the grasping position and the stowed position. The grasping motors 52 are mounted to the disks 38 and connected one to one to the gasping fingers 46. The grasping motors 52 are more precisely van-type rotary actuators driven by hydraulic or pneumatic power. The rotary actuators perform a controlled rotary motion that is transmitted to the grasping fingers through the control arm 54 discussed hereinafter.

As discussed, the disks 38 typically feature a plurality of grasping assemblies 22. The grasping motors 52 are connected to the grasping fingers 46 through a control pivot axis 62, with the control of the position of the control pivot axis 62 permitting to control the orientation of the gasping fingers 46, thus the positioning of the grasping fingers 46. Cooperatively to each grasping finger 46, a tooth 48 is mounted in a stationary manner to the disk 38.

According to an embodiment, the tooth 48 are mounted to the disks 38 in a slidable manner. The tooth 48 are able to slide between an extended position (acting in collaboration with the gasping fingers 46 as pliers) and a contracted position. The tooth 48 are operatively connected to the grasping motors 52, the grasping motors 52 actuating concurrently a grasping finger 46 and its cooperating tooth 48 to move in a grasping position and an extended position. The contacted tooth 48, with the present embodiment, is out of the path of any piece of lumber 12 not to be grasped.

Now referring particularly to FIG. 8, each grasping finger 46 is mounted on a first side of a disk 38 according to a control pivot axis 62. A control arm 54 connects the grasping finger 46 to the control pivot axis 62, controlling the position of the grasping finger 46 through rotation of the control arm 54. The plier surface of the grasping finger 46 is located distant from the control pivot axis 62 on the opposite portion of the grasping finger 46. The disk 38 has an oblong opening 56 for the passage of a control arm 54 connecting the grasping motor 52 (mounted to the opposite side of the disks 38) to the grasping finger 46 at the control pivot axis 62. The shape of the opening 56 is for allowing, when connection and positioning initially the pieces together, fine positioning of the grasping finger 46 and therefore having the grasping finger 46 capable of occupying the desired grasping and stowed positions.

An abutment 60 presents an abutment surface to ensure that the grasping finger 46, when in a grasping position, does not "open" over a predetermined range.

According to an embodiment, the control pivot axis 62 is located on the same side of the abutment 60 as the portion of the grasping finger 46 featuring the plier surface. The abutment 60 is located, according to this embodiment, at one end of the grasping finger 46 with the plier surface being located substantially at the other end of the grasping finger 46. The control pivot axis 62 and other attachments responsible for the positioning of the grasping fingers 46 are located in between.

Referring back to FIGS. 6 to 8, the tooth 48 and the grasping finger 46 are mounted on opposed sides of the disk 38, the latter being located on the same side as the grasping motor 52. The tooth 48 is mounted to the other side of the disk 38 provides space for the grasping finger 46 to rotate around its finger pivot axis 62 without the tooth 48 hindering its rotation. According to another embodiment, the tooth 48 and the grasping finger 46 are mounted on the same side of the disk 38.

The number of disks 38 to which are mounted the grasping assemblies 22 is at least two (2). Accordingly, a plurality of grasping assemblies 22 work together to move a piece of lumber 12 downstream the conveying surface 26, and some of the grasping assemblies 22 may have grasping fingers 46 in a stowed position for facing pieces of lumber 12 of different length. Preferably, the number of disks 38 to which are mounted the grasping assemblies 22 is at least three (3) so that one grasping assembly 22 may be in a stowed position while at least two (2) grasping assemblies 22 grasp a piece of lumber 12. Typically, the number of disks may be about six (6).

Typically, the disks 38 on which are mounted grasping assemblies 22 rotate concurrently through their mounting to a common disk shaft 50 driving concurrently the plurality of disks 38; the disk shaft 50 being driven by a motor (not shown) or the like.

According to an embodiment, the number of grasping assemblies 22 mounted to the disks 38 is six (6). According to that embodiment, the grasping assemblies 22 are evenly distributed on the mounting disks 38. According to an embodiment, grasping fingers 46 mounted to at least two (2) distinct disks 38 of the lumber transfer system 10 are in phase or at the same angle and enabled to operate concurrently. In other words, the grasping fingers 46 are mounted to the disks 38 as to be located in an operating grasping angle in a synchronous manner. According to an embodiment, the grasping fingers 46 are evenly distributed over the mounting disks 38.

Figure 4:
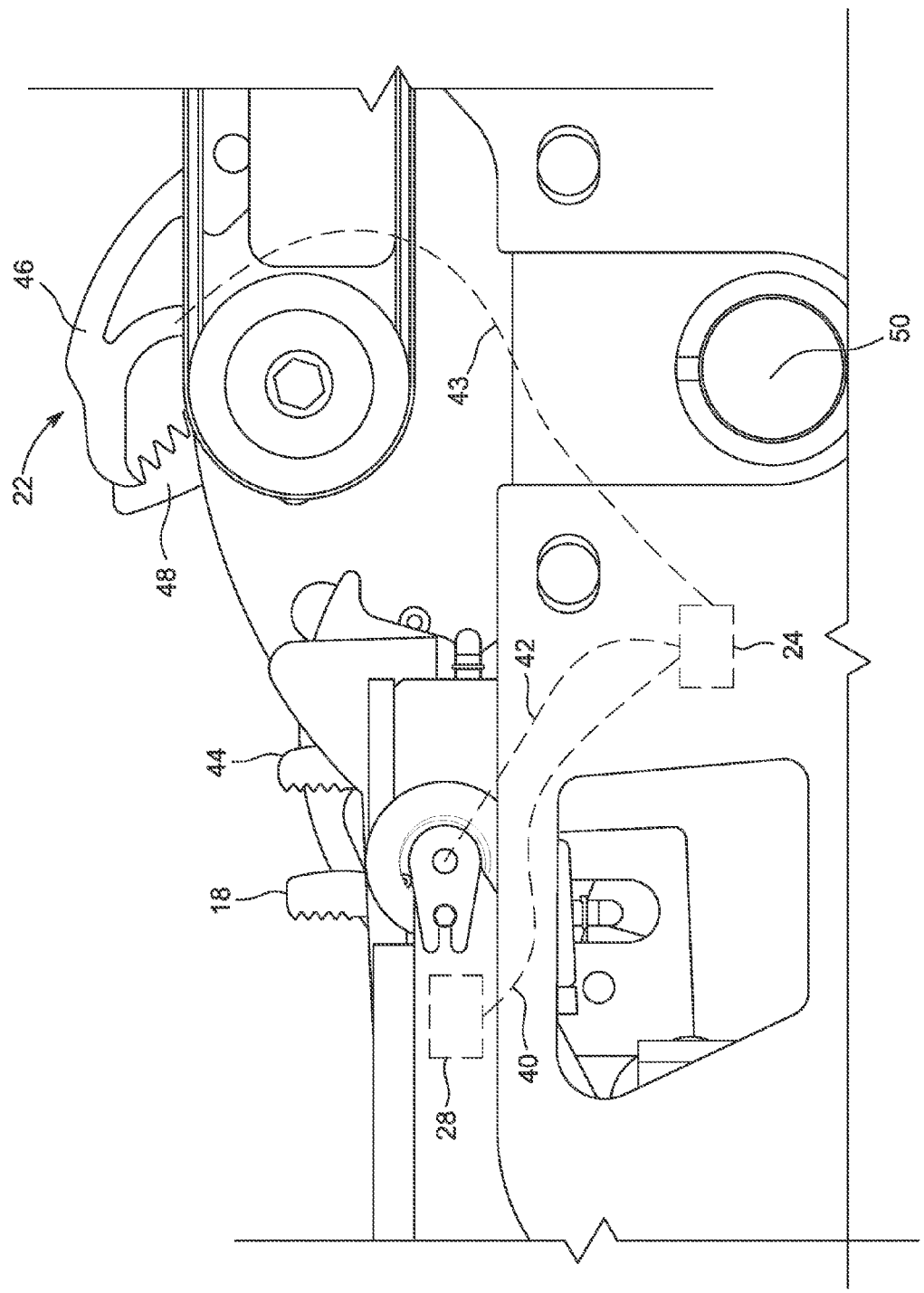
FIG. 4 is an enlarged view of a portion of what is shown in FIG. 3.

Regarding the control of the grasping assemblies 22, according to an embodiment, both the detectors 28 and the finger motorizing components (the grasping motors 52 controlling the positioning of the grasping fingers 46) are connected to the controller 24 (as shown in FIG. 4), which is a PLC (Programmable Logic Controller). The controller 24 consists of a single PLC. Alternatively, the controller 24 comprises, or is distributed over, multiple PLCs. Of course, other types of controllers may be used, such as a server or a PC (personal computer) or in its simplest form, a connecting switch board for interconnecting relays.

In addition to input components 40 for receiving signals from the detectors 28, the controller 24 is provided with output components 43 for sending independently discrete control signals to each one of the grasping motors 52 (or other controllable components responsible for positioning the grasping fingers 46). The discrete control signals, one per grasping assembly 22, are determined and sent based on processing of the signals received from the detectors 28, for positioning the respective grasping fingers 46 in view of whether or not the presence of a piece of lumber 12 is detected (i.e., the status of the detected piece of lumber 12). After operation, i.e., after a grasping finger 46 moves beyond a lumber grasping angle and a releasing angle (thus outside the operating range of a grasping assembly 22), the grasping fingers 46 can move to a default position or can remain in last operating position based on signals received.

According to an embodiment, the rotation of the disks 38 is also controlled by the controller 24. According to an embodiment, the feeding conveyor 14, the positioning fingers 44, the grasping assemblies 22 and the outfeed conveyor 16 as the motors driving these different components are all connected to the controller 24, which controls, manages and synchronizes the overall operation of the transfer lumber system 10, including the speed of the feeding conveyor 14, the speed of the outfeed conveyor 16, the speed of the disks 36, and the speed of the grasping assemblies 22, as can be easily understood by a person skilled in the art.

Figure 10:
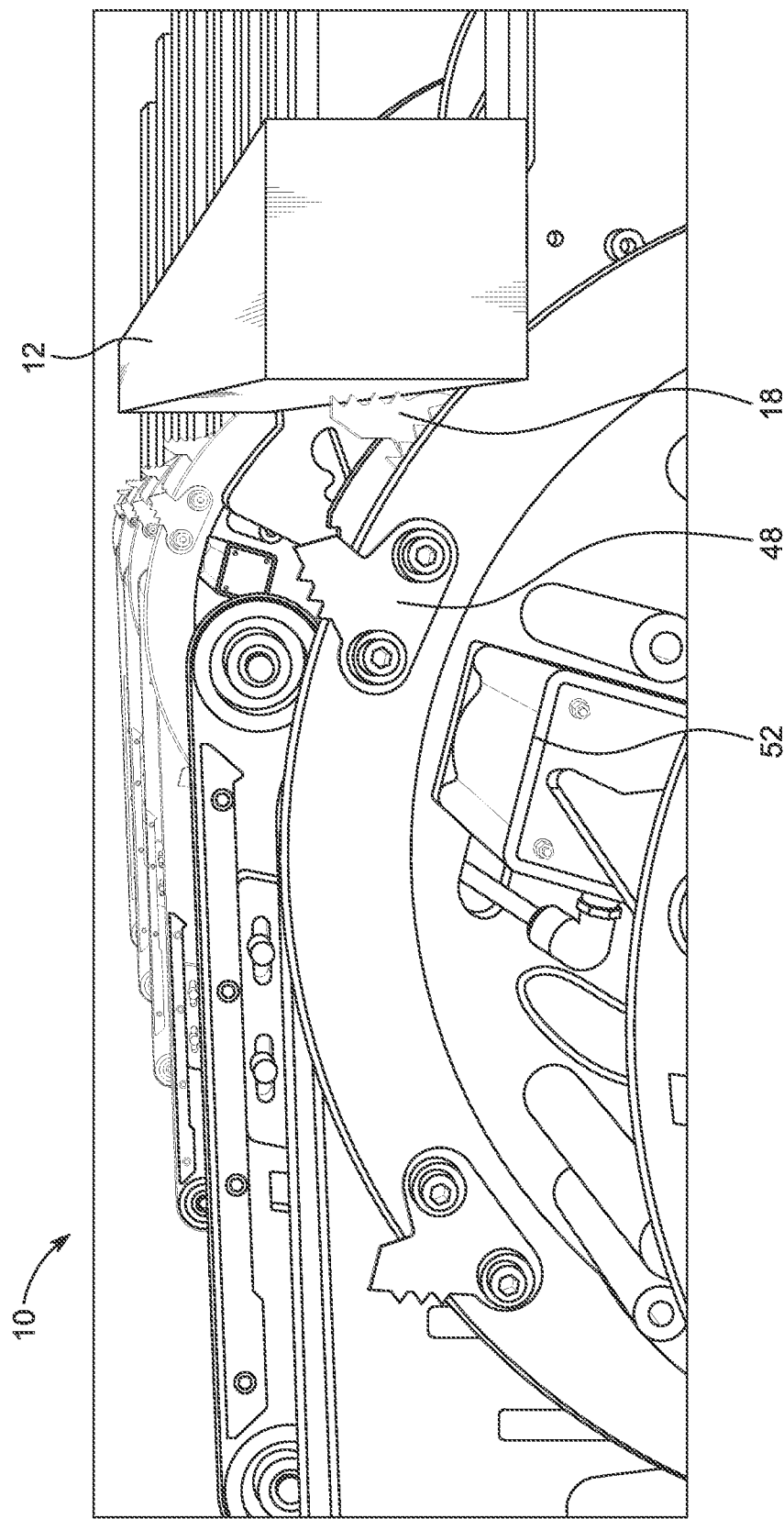
FIG. 10 is a side perspective view of the lumber transfer system of an embodiment at a first step when a piece of lumber is about to be grasped by grasping fingers.
Figure 11:
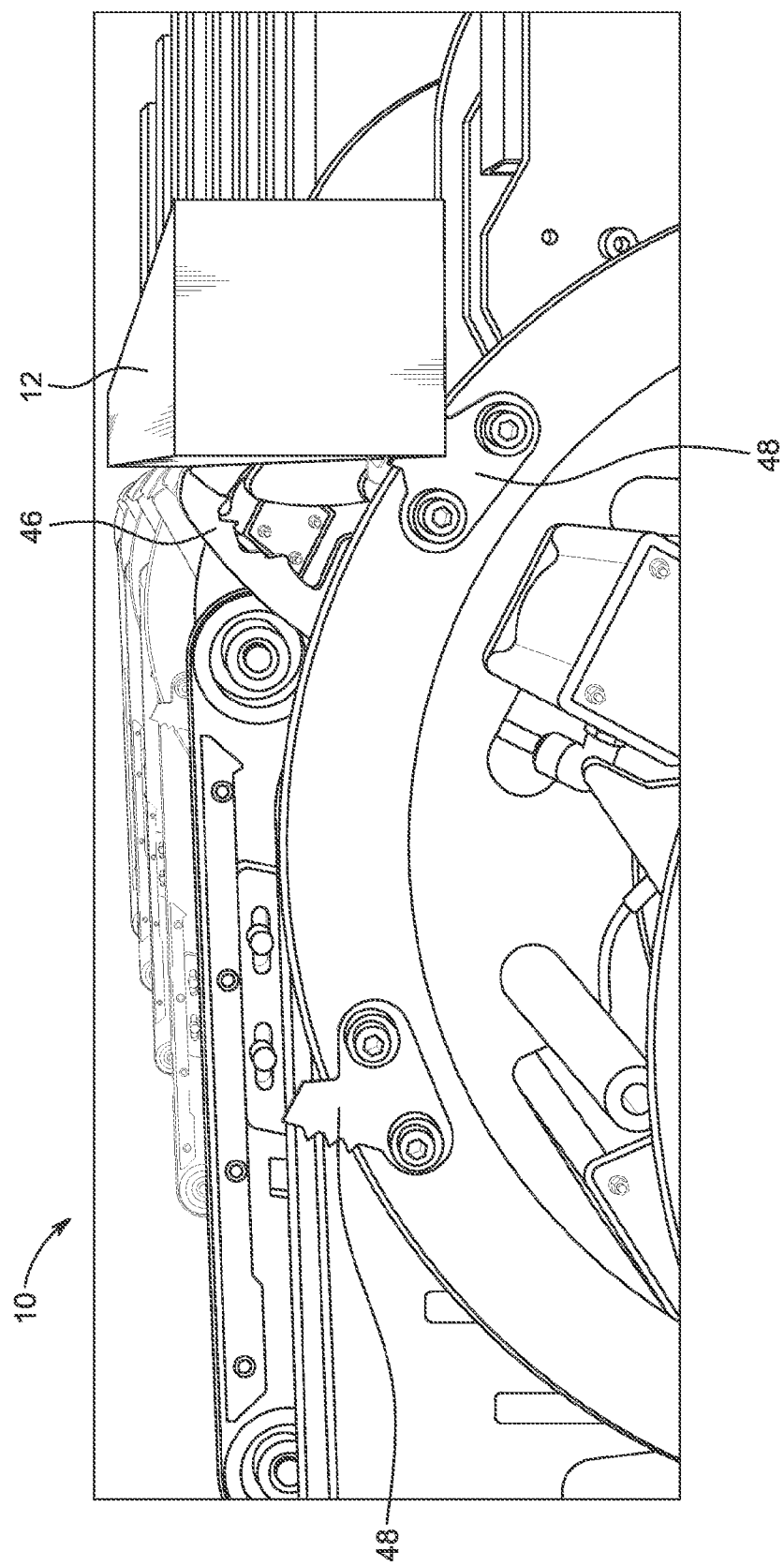
FIG. 11 is a side perspective view of the lumber transfer system of FIG. 10 when the piece of lumber is grasped by grasping fingers.

Referring now to FIGS. 10 to 12, these figures are showing moments during a sequence when a piece of lumber 12 is transferred by grasping fingers 46 of the lumber transfer system 10 from an upstream position relatively to the disks 38 to a downstream position. FIG. 10 shows a first moment when the piece of lumber 12 is located upstream from the disks 38 and about to be grasped by grasping fingers 46. FIG. 11 shows the piece of lumber 12 when grasped by grasping fingers 46. FIG. 12 shows the piece of lumber 12 at a later time when the grasping fingers 46 have released their grip on the piece of lumber 12 and at which time the piece of lumber 12 is about to be moved on the conveying surface 26 downstream to the disks 38.

According to an alternative embodiment (not shown), displacement of each gasping finger 46 is performed by a cylinder (hydraulic or pneumatic) mounted on the same side of the disk 38 as the grasping finger 46; the cylinder being secured pivotally to the grasping finger 46 at the control pivot axis 62 at one of its ends and secured pivotally to a lug (not shown) extending from the disk 38 at the other of its ends. The cylinder is controllably driven by pressured fluid (hydraulic or pneumatic) fed by a pump to the cylinder through tubing with a controllable valve controlling the fluid fed to the cylinder. The pump is typically located on the other side of the disk 38 with the feeding tubes passing through the disks 38 through openings. The controller 24 is linked to the valve, with the valve opening and closing based on control signals received from the controller 24.

According to an embodiment (not shown), a bias component such as a spring is secured to each of the grasping finger 46. The spring biases the grasping finger 46 in a default position, namely the stowed position. Therefore, upon failure of a component powering the grasping fingers 46, the grasping fingers 46 will not contact any other component which would potentially result in premature wearing or component breakage.

According to an embodiment (not shown), the grasping assemblies 22 are grouped based on phase, wherein two grasping assemblies 22 operating at the same angle, thus potentially concurrently, are considered in phase and are part of the same "phase". According to this embodiment, a number of pumps (pneumatic or hydraulic) that is at least equal to the greater of the number of phases and the number of disks 38 is used to drive the grasping assemblies 22. A tubing circuit couples a pump to a single grasping assembly 22 per phase. Further, a controllable valve is associated with each grasping assembly 22. Accordingly, under control of the controller 24, the cylinders of all "in-phase" grasping assemblies 22 that are in operating angle may modify the position of the grasping fingers 46 while being individually powered by a single pump. Based on the locations of the pumps (for instance grouped at one end of the disk shaft 50), the circuit of tubes coupled to a same pump could travel along the disk shaft 50 in a twisted path around the disk shaft 50 to power per disk 38 a "once de-phased" cylinder relatively to the previous disk-mounted cylinder.

According to an embodiment, the outfeed conveyor 16 is a belt conveyor. According to an alternative embodiment, it consists of a chain conveyor. Accordingly, the outfeed conveyor 16 is connected to a downstream lug chain provided with pegs, where individual transferred pieces of lumber 12 are placed, in between two subsequent pegs.

Figure 5:
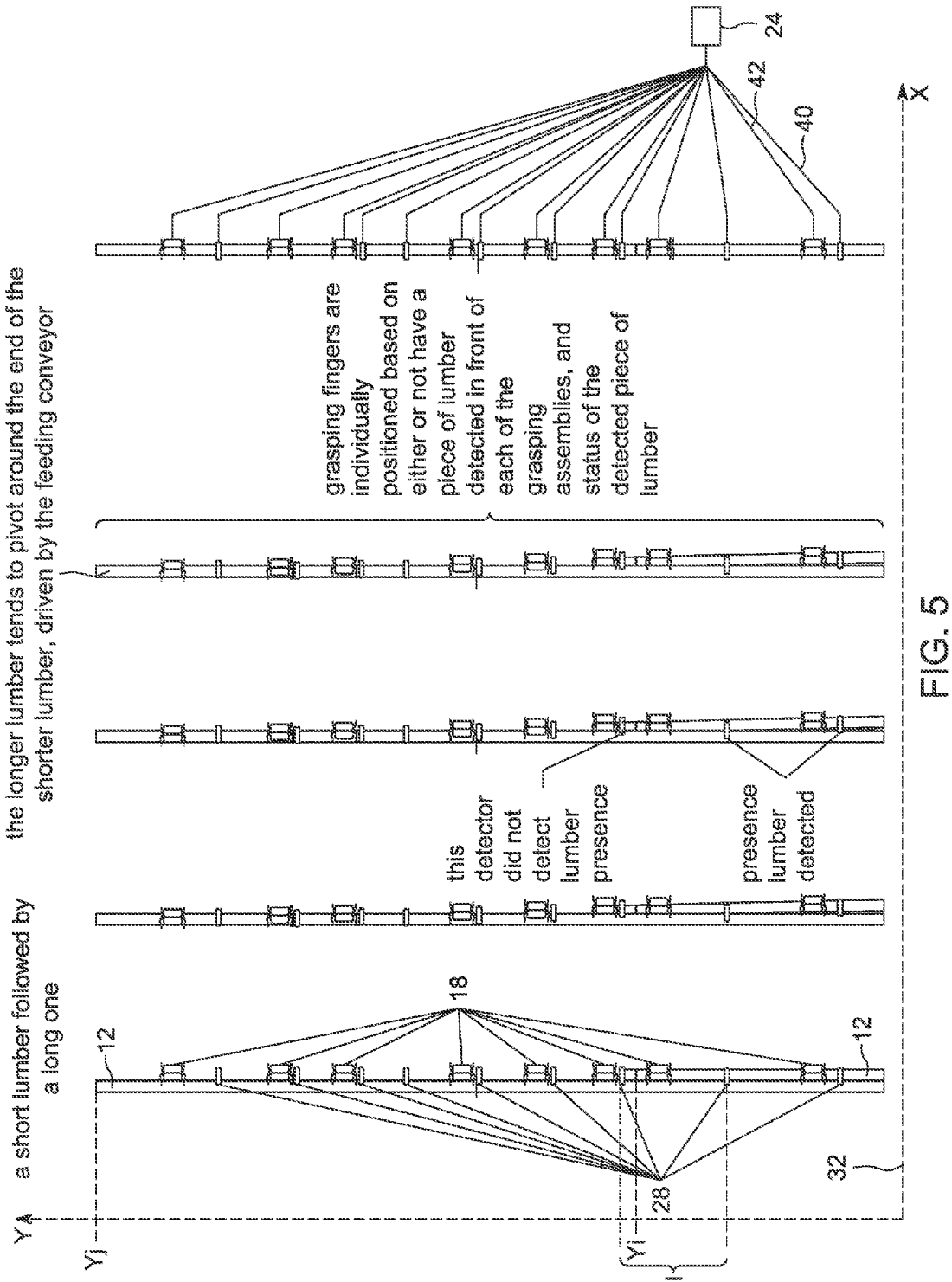
FIG. 5 is a schematic view of steps involved in performing the improved method according to an embodiment.

Referring to FIG. 5, there is described a method or process for individually transferring the substantially parallel pieces of lumber 12 from the feeding conveyor to the outfeed conveyor.

The process comprises a first step of monitoring a lumber presence along the detection corridor 30 on the longitudinal conveying surface 26 of the feeding conveyor 14 using the detectors 28 placed transversally to the conveying surface 26.

A second step comprises the controller 24 receiving signals from the detectors 28. According to an embodiment, each one of the detectors 28 is respectively associated to a grasping assembly 22. The motorized grasping fingers 46 of the grasping assemblies 22 are capable of moving between a grasping position and a stowed position.

A third step comprises the controller 24 sending independently discrete control signals to the grasping motors 52. The controller 24 sends the discrete control signals for independently positioning the grasping fingers 46 in a grasping position when a lumber presence is detected in the corresponding section of the detection corridor 30 and when the detected piece of lumber 12 is to be grasped. For other grasping assemblies 22 with no lumber presence being detected in the corresponding section of the detection corridor 30, the grasping finger 46 are typically forced to take the stowed position. According to alternative embodiments, the grasping finger 46 are remaining in the same position. Otherwise, when a lumber presence is detected in the corresponding section of the detection corridor and the detected piece of lumber 12 is not to be grasped, the grasping finger 46 is positioned in the stowed position.

As can be easily understood from the above-described, the embodiments of the lumber transfer system 10 illustrated in the accompanying drawings are intended for minimizing components and assembling steps, while providing a suitable manner for easily, quickly and efficiently transferring pieces of lumber 12 from a feeding conveyor 14 to an outfeed conveyor 16.

The lumber transfer system 10 and corresponding parts are made of substantially rigid materials, such as metallic materials (stainless steel, cast iron, etc.), hardened polymers, composite materials, polymeric materials, and/or the like, so as to ensure a proper operation thereof depending on the particular applications for which the lumber transfer system 10 is intended and the different parameters in cause, as apparent to a person skilled in the art.

As may now be appreciated, the present embodiments are a substantial improvement over the lumber transfer systems of the prior art in that, by virtue of its design and components, as briefly explained herein, the lumber transfer system 10 according to the present embodiments enables to individually control grasping fingers 46 in response to corresponding detection signals so as to prevent a portion of a longer piece of lumber to pivot around the extremity of a shorter downstream piece of lumber, in order to prevent the longer piece of lumber from being grasped and transferred into the outfeed conveyor 16 with the shorter piece of lumber.

Another advantage resulting from the present embodiments is that human intervention is substantially reduced in order to ensure a proper alignment between a pair of neighbouring pieces of lumber, especially in cases when one is much longer than the other, and that the resulting parallel pieces of lumber can be thus be individually transferred from the feeding conveyor to a outfeed conveyor in a much improved manner (faster, more reliable, etc.), thereby significantly improving productivity and other desirable factors related to the operation of a mill.

Of course, numerous modifications could be made to the above-described embodiments without departing from the scope of the description, as apparent to a person skilled in the art.

The invention claimed is:

1. A lumber transfer system for transferring longitudinal pieces of lumber from a feeding conveyor to an outfeed conveyor, the pieces of lumber being conveyed in a conveying direction which is substantially transverse to their length, the lumber transfer system comprising:

a detection system adapted for monitoring a presence of a piece of lumber and for producing detection signals;

grasping assemblies spaced apart transversely relative to the conveying direction; and a controller, in communication with the detection system and the grasping assemblies, that receives the detection signals from the detection system, processes the detection signals to produce discrete control signals and sends the discrete control signals to each one of the grasping assemblies;

wherein each one of the grasping assemblies is adapted to independently adopt, based on the discrete control signals, at least a grasping position and a stowed position, wherein, in the grasping position, the grasping assemblies grasps a piece of lumber to transfer it from the feeding conveyor to the outfeed conveyor, and wherein, in the stowed position, a piece of lumber remains ungrasped by the grasping assemblies.

2. The lumber transfer system of claim 1, further comprising a detection corridor oriented substantially transversely with respect to the conveying direction, wherein the detection system is adapted for monitoring a presence of a piece of lumber within the detection corridor and thereby produce the detection signals.

3. The lumber transfer system of claim 2, wherein the grasping assemblies are located downstream from the detection corridor.

4. The lumber transfer system of claim 2, wherein the detection system comprises: a combination of detectors detecting a presence of a piece of lumber relative to discrete portions of the detection corridor, and one or more detectors detecting in combination a presence of a piece of lumber over an entirety of the detection corridor.

5. The lumber transfer system of claim 1, wherein the detection system comprises at least one of: a camera, a photocell detector, and an ultrasound detector.

6. The lumber transfer system of claim 1, wherein the detection system is contact-free.

7. The lumber transfer system of claim 1, wherein the detection system comprises a contact-based component detecting a presence of a piece of lumber upon contact with a piece of lumber.

8. The lumber transfer system of claim 1, wherein each one of the grasping assemblies comprises a grasping finger adapted for adopting the grasping position and the stowed position.

9. The lumber transfer system of claim 1, further comprising at least one of blocking fingers and positioning fingers, wherein the controller further controls at least one of the blocking fingers and the positioning fingers.

10. A lumber transfer system for transferring pieces of lumber along a conveying direction comprising an exit, the lumber transfer system comprising:

a feeding conveyor having a conveying surface for receiving the pieces of lumber in a substantially transverse orientation with respect to the conveying direction, and for conveying the pieces of lumber therealong downstream toward the exit;

grasping assemblies spaced apart transversely along the conveying surface, each one of the grasping assemblies comprising a grasping finger able to be positioned independently in a grasping position and a stowed position, wherein the grasping finger in the grasping position is capable to grasp a piece of lumber located upstream from each one of the grasping assemblies and to move the piece of lumber in a downstream position, and wherein the grasping finger in the stowed position prevents the grasping finger from grasping a piece of lumber located upstream therefrom;

a detection system for:

detecting a presence of a piece of lumber within a detection corridor oriented substantially transversely with respect to the conveying direction and upstream from the grasping assemblies, and producing detection signals based on detection of a presence of a piece of lumber;

and a controller for receiving the detection signals from the detection system, processing the detection signals and sending discrete control signals to the grasping assemblies for the grasping fingers to be positioned independently in either one of the grasping position and the stowed position, wherein the lumber transfer system is able to have only grasping fingers responsible for grasping the piece of lumber in the grasping position.

11. The lumber transfer system of claim 10, wherein the grasping assemblies are spaced apart unevenly.

12. The lumber transfer system of claim 10, wherein the detection system comprises at least one selected from a group comprising: a camera, a photocell detector, an ultrasound detector.

13. The lumber transfer system of claim 10, wherein the detection system is contact-free.

14. The lumber transfer system of claim 10, wherein the detection system comprises a contact-based component detecting a presence of a piece of lumber upon contact with a piece of lumber.

15. The lumber transfer system of claim 10, wherein the detection system for detecting presence of a piece of lumber within the detection corridor comprises: a combination of detectors detecting a presence of a piece of lumber relatively to discrete portions of the detection corridor, and one or more detectors detecting presence of a piece of lumber over an entirety of the detection corridor.

16. The lumber transfer system of claim 10, further comprising at least one of blocking fingers and positioning fingers, wherein the controller further controls at least one of the blocking fingers and the positioning fingers.

17. The lumber transfer system of claim 10, further comprising a shaft driven at a speed with the grasping assemblies being mounted thereto, wherein the controller further controls the speed of the shaft.

18. The lumber transfer system of claim 10, further comprising at least one of a feeding conveyor and an outfeed conveyor, wherein the controller further controls a speed of one of the feeding conveyor and the outfeed conveyor.

19. The lumber transfer system of claim 10, wherein the grasping assemblies further comprise biasing means, wherein the biasing means forces the grasping fingers in the stowed position when not actuated.

20. The lumber transfer system of claim 10, wherein each one of the grasping assemblies further comprises a tooth cooperating with the grasping finger, wherein the tooth is operable between an extended position and a contracted position concurrently with a positioning of the cooperating grasping finger.

* * * * *